US012629624B2

(12) United States Patent
Rönnings et al.

(10) Patent No.: US 12,629,624 B2
(45) Date of Patent: May 19, 2026

(54) AIR FILTER ELEMENT

(71) Applicant: VOLVO TRUCK CORPORATION, Gothenburg (SE)

(72) Inventors: Hans Rönnings, Gothenburg (SE); Carl Löwstedt, Onsala (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 441 days.

(21) Appl. No.: 17/904,272

(22) PCT Filed: Feb. 21, 2020

(86) PCT No.: PCT/EP2020/054659
§ 371 (c)(1),
(2) Date: Aug. 15, 2022

(87) PCT Pub. No.: WO2021/164886
PCT Pub. Date: Aug. 26, 2021

(65) Prior Publication Data
US 2023/0089339 A1     Mar. 23, 2023

(51) Int. Cl.
B01D 46/42 (2006.01)
B01D 46/00 (2022.01)
(Continued)

(52) U.S. Cl.
CPC ..... B01D 46/4227 (2013.01); B01D 46/0005 (2013.01); B01D 46/2414 (2013.01);
(Continued)

(58) Field of Classification Search
CPC ............ B01D 46/4227; B01D 46/0005; B01D 46/2414; B01D 46/521; B01D 2265/026; B01D 2279/60; B01D 2265/028
See application file for complete search history.

(56) References Cited

U.S. PATENT DOCUMENTS 4,964,984 A * 10/1990 Reeder ................ A61M 1/3627
96/219
5,106,397 A     4/1992 Jaroszczyk et al.
(Continued)

FOREIGN PATENT DOCUMENTS

CN     101060906 A     10/2007
CN     101060908 A     10/2007
(Continued)

OTHER PUBLICATIONS

International Search Report and Written Opinion of the International Searching Authority in corresponding International Application No. PCT/EP2020/068884 mailed Sep. 3, 2020 (14 pages).
(Continued)

*Primary Examiner* — Jennifer Dieterle
*Assistant Examiner* — Phillip Y Shao
(74) *Attorney, Agent, or Firm* — Jeffri A. Kaminski; Venable LLP

(57)     ABSTRACT

An air filter element includes a first end and a second end located opposite to the first end in relation to a longitudinal direction of the air filter element. The air filter element is configured for axial insertion into a filter housing with the first end leading the axial insertion. The air filter element includes a gripping structure at the second end, the gripping structure comprising an external surface accessible for interaction by a tool to facilitate removal of the air filter element from the filter housing. The gripping structure is also configured to, during insertion of the air filter element into the filter housing, radially align the air filter element in the filter housing.

25 Claims, 6 Drawing Sheets

(51) Int. Cl.
  *B01D 46/24* (2006.01)
  *B01D 46/52* (2006.01)

(52) U.S. Cl.
  CPC ...... *B01D 46/521* (2013.01); *B01D 2265/026*
  (2013.01); *B01D 2279/60* (2013.01)

(56) References Cited

U.S. PATENT DOCUMENTS

| | | | |
|---|---|---|---|
| 6,217,627 B1 | 4/2001 | Vyskocil et al. | |
| 9,545,587 B2 * | 1/2017 | Tucker ................. | B01D 35/153 |
| 9,682,341 B2 | 6/2017 | Williams et al. | |
| 10,556,199 B2 | 2/2020 | Luchesi De Almeida et al. | |
| 2002/0162309 A1 * | 11/2002 | Schmitz ............. | B01D 46/2414 |
| | | | 55/423 |
| 2005/0061292 A1 | 3/2005 | Prellwitz et al. | |
| 2006/0157403 A1 * | 7/2006 | Harder ................. | B01D 27/005 |
| | | | 210/445 |
| 2009/0249754 A1 | 10/2009 | Amirkhanian et al. | |
| 2011/0203240 A1 * | 8/2011 | Langner ............. | F02M 35/0203 |
| | | | 55/492 |
| 2013/0042587 A1 | 2/2013 | Traub | |
| 2014/0223874 A1 | 8/2014 | Kaufmann et al. | |
| 2016/0102637 A1 | 4/2016 | Desjardins | |
| 2016/0220935 A1 | 8/2016 | Ruhland et al. | |
| 2018/0257011 A1 | 9/2018 | Boden et al. | |
| 2018/0369732 A1 | 12/2018 | Karlsson et al. | |
| 2019/0046904 A1 | 2/2019 | Noren et al. | |

FOREIGN PATENT DOCUMENTS

| | | | |
|---|---|---|---|
| CN | 102015062 A | 4/2011 | |
| CN | 103547352 A | 1/2014 | |
| CN | 104220142 A | 12/2014 | |
| CN | 108136296 A | 6/2018 | |
| CN | 108367221 A | 8/2018 | |
| CN | 108412645 A | 8/2018 | |
| CN | 108472568 A | 8/2018 | |
| CN | 108472569 A | 8/2018 | |
| EP | 0823548 A2 | 2/1998 | |
| EP | 2364763 A1 | 9/2011 | |
| EP | 2247364 B1 | 4/2014 | |
| EP | 3352880 A1 | 8/2018 | |
| GB | 2450735 A | 1/2009 | |
| WO | 2012172020 A2 | 12/2012 | |
| WO | 13063497 A2 | 5/2013 | |
| WO | 2017050365 A1 | 3/2017 | |
| WO | 2017050366 A1 | 3/2017 | |
| WO | 2017102027 A1 | 6/2017 | |
| WO | 2017103048 A1 | 6/2017 | |
| WO | 18111822 A1 | 6/2018 | |
| WO | 2019219636 A1 | 11/2019 | |
| WO | 2019238212 A1 | 12/2019 | |

OTHER PUBLICATIONS

International Preliminary Report on Patentability in corresponding International Application No. PCT/EP2020/068884 mailed May 16, 2022 (8 pages).

International Search Report and Written Opinion in corresponding International Application No. PCT/EP2020/054655 mailed Oct. 22, 2020 (13 pages).

International Preliminary Report on Patentability in corresponding International Application No. PCT/EP2020/054655 mailed Feb. 14, 2022 (6 pages).

Chinese Office Action dated Dec. 21, 2023 in corresponding Chinese Patent Application No. 202080096448.1, 18 pages.

International Search Report and Written Opinion in corresponding International Application No. PCT/EP2020/054659 mailed Oct. 21, 2020 (13 pages).

Second Written Opinion of the International Preliminary Examining Authority in corresponding International Application No. PCT/EP2020/054659 mailed Jan. 28, 2022 (5 pages).

International Preliminary Report on Patentability in corresponding International Application No. PCT/EP2020/054659 mailed May 23, 2022 (6 pages).

Chinese Office Action dated Mar. 1, 2024 in corresponding Chinese Patent Application No. 202080096474.4, 18 pages.

Non-Final Office Action dated May 22, 2024 in corresponding U.S. Appl. No. 18/003,051, 17 pages.

Chinese Office Action dated May 10, 2024 in corresponding Chinese Patent Application No. 202080096448.1, 21 pages.

Final Office Action dated Oct. 8, 2024 in corresponding U.S. Appl. No. 18/003,051, 16 pages.

Non-Final Office Action dated Jan. 24, 2025 in corresponding U.S. Appl. No. 18/003,051, 17 pages.

Non Final Office Action dated Oct. 30, 2024 in corresponding U.S. Appl. No. 17/904,262, 8 pages.

Final Office action dated Mar. 14, 2025 in corresponding U.S. Appl. No. 17/904,262, 9 pages.

Notice of Allowance dated Jul. 15, 2025 in corresponding U.S. Appl. No. 17/904,262, 7 pages.

Notice of Allowance dated Jun. 4, 2025 in corresponding U.S. Appl. No. 18/003,051, 14 pages.

* cited by examiner

AIR FILTER ELEMENT

CROSS-REFERENCE TO RELATED APPLICATIONS

This application is a U.S. National Stage application of PCT/EP2020/054659, filed Feb. 21, 2020 and published on Aug. 26, 2021, as WO 2021/164886, all of which is hereby incorporated by reference in its entirety.

TECHNICAL FIELD

The present invention relates to an air filter element. The air filter element may alternatively be called filter cartridge, filter module or filter insert. The invention further relates to a filter system comprising an air filter element and a filter housing, and to an internal combustion engine system and a vehicle.

BACKGROUND

Filters are widely used in vehicles. It is e.g. well known to provide an air filter for cleaning intake air for use in an internal combustion engine. Other equipment and components in the vehicle, such as a e.g. compressor for the brake system, may also use clean air from an air filter. Besides air filters, there are other types of filters in a vehicle, e.g. oil filters. The filters can be designed in many different shapes and have various configurations.

An air filter, or an air filter system, typically comprises an air filter element comprising a filter body through which the air is filtered, and a filter housing in which the air filter element is installed. The air filter element is typically replaced on a regular basis to keep the performance of the air filter system, and of the equipment and components utilizing the filtered air, at a desired level.

When the air filter element is to be replaced (or be subject to maintenance), the air filter element is removed from the filter housing. However, removing the air filter element from the filter housing may be cumbersome due to e.g. space constrains in the direct vicinity of the air filter system. Correspondingly, insertion and installation of a new (or cleaned) air filter element into the filter housing may be problematic. One particular problem when installing an air filter element in the filter housing is to align the air filter element within the filter housing. This is especially cumbersome for air filter systems in which the outlet of the air filter element needs to be aligned with the corresponding outlet of the filter housing, or when the air filter system comprises two oppositely arranged outlets supplying clean air to e.g. both the internal combustion engine and an auxiliary component, as e.g. disclosed in US 2005/0061292 A1.

Many air filter elements and corresponding filter housings, as e.g. disclosed in US 2005/0061292 A1, are complex and bulky, leading to extended assembly time and inefficient use of space. Thus, both removal and insertion of the air filter element from/to the filter housing may be challenging. Moreover, the bulkiness may also have a negative effect on noise optimized tuning of the intake system.

There is thus a need in the industry for an improved air filter system.

SUMMARY

It is an object of the present disclosure to at least to some extent alleviate the shortcomings discussed above in relation to known filters, and to improve an air filter element and filter housing, especially for the insertion and removal of the air filter element relative the filter housing.

According to at least a first aspect of the present invention, an air filter element is provided. The air filter element comprises a first end and a second end located opposite to the first end in relation to a longitudinal direction of the air filter element, the air filter element being configured for axial insertion into a filter housing with the first end leading the axial insertion, wherein the air filter element comprises a gripping structure at said second end, said gripping structure comprising an external surface accessible for interaction by a tool to facilitate removal of the air filter element from the filter housing, and being configured to, during insertion of the air filter element into the filter housing, radially align the air filter element in the filter housing.

Hereby, an air filter element having an effective and yet simple structure for the dual task of facilitating insertion and removal of the air filter element relative a filter housing is provided. The air filter element, and specifically the gripping structure, is also simple and compact in its design, whereby its space requirements in its end using facility, such as a vehicle, is reduced.

The inventors have realized that by having a gripping structure, serving both as a guiding or aligning element for facilitating insertion of the air filter element into the filter housing, and as tool interacting element for facilitating removal of the air filter element from the filter housing, handling of the air filter element in relation to the filter housing is improved in an efficient way. Therefore, the gripping structure at the second end of the air filter element is configured for interaction to facilitate removal of the air filter element from the filter housing, and is configured to radially align the air filter element in the filter housing. Moreover, the inventors have further realized that the dual functionality of facilitating both insertion and removal of the air filter element relative the filter housing is embodied in the air filter element in a desirable way by having the gripping structure located at the second end of the air filter element (i.e. opposite to the first end which is the leading end during an axial insertion of the air filter element into the filter housing). Thus, guiding or radially alignment of the air filter element to the filter housing is governed by the second end of the air filter element, or in other words, the guiding element (or radially alignment element) is implemented in the second end of the air filter element. The second end is the end of the air filter element visible for a technician during handling of the air filter element, and hereby, the technician installing the air filter element into the filter housing can easily verify that the air filter element is correctly installed.

According to at least one example embodiment, the air filter element comprises a filter body arranged between the first and second ends of the air filter element, the filter body forming an outer sleeve surface configured to receive unfiltered air and being bounded by an outer filter body radius, wherein the gripping structure extends radially outside the outer filter body radius.

Hereby, the above-mentioned dual functionality can be realised in a simple manner, as a gripping structure extending radially outside, or radially outwards, of the outer filter body radius, can provide the external surface for tool interaction (related to air filter element removal), and provide guiding element for radially align the air filter element to the filter housing (related to air filter element insertion).

The gripping structure may e.g. radially extend 10 mm to 40 mm out from the outer filter body radius. That is, the gripping structure may be bounded by an outer gripping structure edge, said edge having a radial distance to a centre axis of the filter body 10 mm to 40 mm larger than a radial distance from the outer sleeve of the filter body to the centre axis of the filter body.

The filter body may further comprise an inner sleeve surface bounded by an inner filter body radius, the inner sleeve being configured to discharge filtered air. That is, during use, the filter body is arranged in the air filter element to receive unfiltered air to said outer sleeve, filter the air through the filter body, and discharge or release the filtered air from said inner sleeve. The filter body may e.g. be shaped as a hollow cylinder or hollow cone (i.e. be cylindrical or conical in shape), wherein the outer and inner sleeves form the outer and inner envelope surfaces of such hollow cylinder or cone, respectively.

According to at least one example embodiment, the filter body may be pleated. Hereby, the contact surface between the air and the filter material in the filter body may be increase. Preferably, the filter body is made of a filter material chosen from the group of: paper and cellulose. These materials are common materials and enables low manufacturing costs.

According to at least one example embodiment, the gripping structure has a thickness of less than 25 mm in the axial direction.

Hereby, the gripping structure may be made compact, but still strong enough to withstand external forces e.g. from a tool used to interact with the air filter element. The thickness of the gripping structure may e.g. be between 10 mm and 25 mm. The axial direction is referring to the axial direction of the air filter element.

According to at least one example embodiment, the air filter element further comprises a first end panel at the first end of the air filter element, and a second end panel at the second end of the air filter element, wherein the gripping structure is integrated into the second end panel.

Hereby, the gripping portion can be made relatively strong, and withstand higher external forces e.g. subjected to by a tool interacting with the external surface. Such integration is also advantageous as the gripping structure is comprised in a component (the second end panel) typically included in air filter elements. Thus, the gripping structure needs not to be constituted of a separate air filter element component, but may be integrated into an existing component.

According to at least one example embodiment, the gripping structure is integrated into the second end panel to form a first gripping portion and a second gripping portion, wherein the first and second gripping portions are arranged distant from each other, e.g. opposite to each other.

By arranging the first and second gripping portions distant from each other, preferably on opposite sides of the second end panel, the removal of the air filter element from the filter housing is improved. Hereby, a technician may grip the first and second gripping portions of the gripping structure, by hand or by a tool, and axially move the air filter element out from the filter housing in a steady manner as the external force applied by the technician to the second end panel is distributed over more than one single location, such as e.g. on both sides of the air filter element.

According to at least one example embodiment, the gripping structure is comprised of one gripping portion. Such gripping portion may e.g. comprise at least an annular portion extending circumferentially of the second end panel, and may thus comprise the complete outer boundary of the second end panel. In such case, the gripping portion may further comprise a first sub-portion and a second sub-portion integrated in the second end panel distant from each other, e.g. on opposite sides.

According to at least one example embodiment, the second end panel has an outer flat surface extending in a geometrical plane perpendicular to the longitudinal direction of the air filter element. In other words, the outer flat surface extends in a geometrical plane parallel to a radial direction of the air filter element (and may thus be referred to as a radial surface).

That is, the gripping structure may form a part of the outer flat surface of the second end panel, and thus not extend or protrude axially outwards from the second end panel in a direction away from the air filter element.

According to at least one example embodiment the second end panel is bound by an outer border which together with the gripping structure forms an irregular contour about/ around the longitudinal axis of the air filter element.

The irregularity of the outer border may thus form the gripping structure.

According to at least one example embodiment, the air filter element further comprises a first outlet located in the first end and being configured to communicate with a corresponding first housing outlet in the filter housing, and a second outlet located in the second end and being configured to communicate with a corresponding second housing outlet in the filter housing, wherein the gripping structure is configured to align the air filter element in the filter housing such that the second outlet aligns with the second housing outlet.

The first outlet may typically be adapted for conveying clean air to an internal combustion engine of a vehicle. The second outlet may typically be adapted for conveying clean air to an auxiliary component of the vehicle. Hereby, the air filter element is configured to clean the air for the auxiliary component and at the same time it will work as a noise reducing component in the system (explained below).

According to at least one example embodiment, the air filter element has a tubular shape defining an inner space in communication with the first and second outlets, the first outlet having a first centre axis and the second outlet having a second centre axis parallel and arranged at an offset position in relation to the first centre axis in a direction perpendicular to the first and second centre axes.

This improves the acoustic response when using the air filter element. The offset position involves a distance, and preferably is a distance, in the transversal direction (or radial direction) of the air filter element, the offset position is a mutual distance as seen in the transversal direction of the air filter element between a centre point in the first outlet and a centre point in the second outlet.

According to at least one example embodiment, the first end panel houses the first outlet, and is arranged to block any filtered fluid to exit the air filter element axially through the first end panel, other than through the first outlet. This provides a simple design and for enabling a proper sealing effect between the air filter element and a filter housing when installed therein. Moreover, this provides for a certain air flow and for a desired flow and filtration performance.

According to at least one example embodiment, the second end panel houses the second outlet, and is arranged to block any filtered fluid to exit the air filter element axially through the second end panel other than through the second outlet. This enables a correct fluid flow without any leakage, and thereby an improved filtering performance. Moreover, the acoustic response of the air filter element is improved, as well as a minimising of any interference between the respective flows of fluid through the first and second outlets is achieved. Thus, a controlled flow of filtered air, through the first and second outlets of the air filter element is provided.

According to at least one example embodiment, the air filter element has a cross-sectional shape with a first extension in a first direction and a second extension in a second direction which is perpendicular to said first direction. The first extension may according to one example embodiment greater than the second extension, such that the cross-sectional shape is oval, preferably generally elliptical. This enables locating the second outlet at an offset position in relation to the first outlet at an increased distance compared to for example a circular shape, thereby allowing for a further increased distance between the second outlet and the first outlet in order to improve the acoustic response. The first extension may alternatively be equal to the second extension.

According to at least one example embodiment, the above-mentioned offset position of the second outlet in relation to the first outlet is along the first extension direction. According to at least one example embodiment, the first outlet and/or the second outlet has a generally cylindrical cross-section. According to at least one example embodiment, the first outlet is located coaxially with the air filter element. According to at least one example embodiment, a cross-sectional shape and dimension of the first outlet is substantially the same as a cross-sectional shape and dimension of the inner space of the air filter element. According to at least one example embodiment, a cross-sectional area of the second outlet is substantially smaller than a cross-sectional area of the inner space of the air filter element. According to at least one example embodiment, a cross-sectional area of the second outlet is substantially smaller than a cross-sectional area of the first outlet. According to at least one example embodiment, a cross-sectional shape of the second outlet is substantially the same as a cross-sectional shape of the first outlet, wherein a cross-sectional dimension of the second outlet is substantially smaller than a cross-sectional dimension of the first outlet. This improves the acoustic response of the air filter element, and enables a compact design.

According to at least one example embodiment, the air filter element is adapted to be removably arranged in the filter housing.

Herby, the air filter element can be removed from the filter housing, be subject to maintenance, and subsequently re-inserted into the filter housing. Alternatively, a new air filter element, corresponding to the removed air filter element, can be inserted into the filter housing. The air filter element may e.g. be configured to be supplied to a filter system of an internal combustion engine in a vehicle.

According to at least a second aspect of the invention, a filter system comprising an air filter element according to the first aspect of the invention, and a filter housing is provided. The filter housing comprises an inner housing space adapted for axial insertion and removal of the air filter element into/from the inner housing space, the filter housing having a first housing end arranged adjacent to the first end of the air filter element when housed in said inner housing space, and a second housing end located distant to the first housing end in relation to a longitudinal direction of the filter housing, the second housing end being arranged adjacent to the second end of the air filter element when housed in said inner housing space, wherein the filter housing comprises a guiding structure at the second housing end configured to mate with the gripping structure of the air filter element to radially align the air filter element in the filter housing during insertion of the air filter element into the filter housing.

Hereby, a filter system having an effective and yet simple structure for the dual task of facilitating insertion and removal of the air filter element into the filter housing is provided. Thus, guiding or radially alignment of the air filter element to the filter housing is governed by the gripping structure at the second end of the air filter element, and the guiding structure at the second housing end of the filter housing, so that guiding or alignment of the air filter element to the filter housing is governed by the same side, i.e. the respective second ends of the air filter element and the filter housing. The second end, and the second housing end, is the ends of the filter system visible for a technician during handling of the air filter element relative the filter housing, and hereby, the technician installing the air filter element into the filter housing can easily verify that the air filter element is correctly installed.

According to at least one example embodiment, the gripping structure and the guiding structure is arranged to provide a locking interaction, such as e.g. a releasably locking interaction, between the air filter element and the filter housing, when the air filter element is installed in the filter housing. Hereby, the gripping structure and the guiding structure act to stabilize the air filter element in the filter housing, such that the air filter system better manage e.g. vibrations. The locking interaction may e.g. be a snap-lock wherein one of the gripping structure and guiding structure is a male connector, and the other one of the gripping structure and guiding structure is a female connector.

It should be understood that the first housing end and the first end of the air filter element are located in the same end of the filter system, i.e. being adjacent. The first housing end may e.g. at least partly face the first end of the air filter element, and/or it may circumferentially encompass the second end of the air filter element, when the air filter element is housed in the filter housing, depending on the structure of the filter housing. Correspondingly, the second housing end and the second end of the air filter element are located in the same end of the filter system, i.e. being adjacent. The second housing end may e.g. circumferentially encompass the second end of the air filter element, when the air filter element is housed in the filter housing. The filter system may further comprise a filter housing lid connectable to the second housing end, and configured to close the air filter element into the filter housing.

According to at least one example embodiment, the second housing end is an annular edge arranged parallel to the second end of the air filter element, when the air filter element is housed in the filter housing.

According to at least one example embodiment the guiding structure is a guiding indentation.

Hereby, a simple but yet effective guiding function of the filter system is provided. The gripping structure may thus be a protrusion arranged and configured to mate with the guiding indentation. The guiding indentation may preferably be arranged in the above-mentioned annular edge of the second housing end.

According to at least one example embodiment, the guiding structure comprises a first guiding portion and a second guiding portion, the first and second guiding portions being arranged distant from each other. The first guiding portion is typically adapted to mate with the above-mentioned first gripping portion, and the second guiding portion is typically adapted to mate with the above-mentioned second gripping portion. Hereby, the guiding or alignment of the air filter element to the filter housing is improved, as at least two separate guiding points are used. The first and the second guiding portions may be formed as indentations at the second housing end, and the first and second gripping portions may be formed as protrusions arranged and configured to mate with the indentations to radially align the air filter element in the filter housing.

According to at least one example embodiment, the gripping structure is configured to rest against an edge in the filter housing to axially position the air filter element within the filter housing.

Hereby, the risk of having the air filter element inserted to far (axially) into the filter housing, or risking of dropping the air filter element to far into the filter housing, is reduced or even omitted. It should be understood that the gripping structure is configured to rest against an edge in the filter housing, when the air filter element is housed or installed, in the filter housing.

Thus, the gripping structure is preferably sized and dimensioned to radially extend further, or at least up to, said edge of the filter hosing. The edge may e.g. be the above-mentioned annular edge of the second housing end.

According to at least one example embodiment, the gripping structure is arranged to mate with the guiding structure to form a tool interaction portion configured to be accessed by a tool to facilitate removal of the air filter element from the filter housing.

Hereby, the external surface of the gripping structure is arranged such that it is accessible for interaction by a tool to facilitate removal of the air filter element from the filter housing, when the air filter element is housed in the filter housing, and the gripping structure is mated with the guiding structure of the filter housing. Thus, it should be understood that when the air filter element is housed in the filter housing, and when the air filter element has been radially aligned to the filter housing by the interaction between the gripping structure and guiding structure, the gripping structure is arranged in the guiding structure to form said tool interaction portion.

According to at least one example embodiment, the tool interaction portion is a gap between a surface of gripping structure, and an opposite facing surface of the guiding structure.

The gap provides a simple but yet effective way for a tool to access the external surface of the gripping portion. The gap may e.g. be embodied by step-like design of the gripping structure and/or guiding structure.

According to at least one example embodiment, the inner housing space comprises an inner housing surface being bounded by an inner housing radius, wherein, when the air filter element is housed in the filter housing, the gripping structure extends radially outside of the inner housing radius.

Hereby, the accessibility of the gripping portion is further improved.

The inner housing radius is typically larger than the outer filter body radius so that the air filter element can fit into the filter housing, but the radially extension of the gripping structure outside of the inner housing radius prevents the air filter element to be inserted axially to far into the filter housing.

According to at least one example embodiment, the filter housing comprises a housing inlet, a first housing outlet located in the first housing end and having a first housing centre axis, and a second housing outlet located opposite the first housing end relative the inner housing space, and having a second centre housing axis, wherein the second housing outlet has an offset position in relation to the first housing outlet in a direction perpendicular to the extension of the first and second centre axes.

The first housing outlet and the second housing outlet are preferably configured and arranged as already described in relation to the first aspect of the invention. That is, the first outlet of the air filter element is configured to communicate with the first housing outlet in the filter housing, and the second outlet of the air filter element is configured to communicate with the second housing outlet in the filter housing. Correspondingly, the first housing outlet is having a first centre axis and the second housing outlet is having a second centre axis parallel and arranged at an offset position in relation to the first centre axis in a direction perpendicular to the first and second centre axes. The offset position involves a distance, and preferably is a distance, in the transversal direction of the filter housing, the offset position is a mutual distance as seen in the transversal direction of the filter housing.

According to at least one example embodiment, the gripping structure and the guiding structure are configured and arranged to align the second outlet of the air filter element with the second housing outlet of the filter housing. Hereby, alignment of the air filter element in the filter housing, enables the second outlet of the filter housing to mate with the second housing outlet.

Additionality, or alternatively, the gripping structure and the guiding structure are configured and arranged to align the first outlet of the air filter element with the first housing outlet of the filter housing. Hereby, alignment of the air filter element in the filter housing, enables the first outlet of the filter housing to mate with the first housing outlet.

According to at least one example embodiment, the first housing outlet is located in parallel relationship with the second housing outlet.

According to at least one example embodiment, the filter housing has a tubular shape. This enables a compact design of the filter housing.

According to at least one example embodiment, the filter housing has a cross-sectional shape which has a first extension in a first direction and a second extension in a second direction, wherein the first extension is greater than the second extension, the second extension preferably being perpendicular to the first extension and that the cross-sectional shape is generally elliptical. The first extension may alternatively be equal to the second extension.

According to at least one example embodiment, a direction of the offset position between the second housing outlet and the first housing outlet coincides with the first extension direction.

According to at least one example embodiment, the first outlet of the air filter element is located coaxially with the filter housing, and the first housing outlet. This enables a compact design of the filter housing.

According to at least one example embodiment, the housing inlet is located in an envelope surface of the filter housing. This enables a compact design of the filter housing.

According to at least one example embodiment, the housing inlet is located in the envelope surface at a position coinciding with the first extension direction. This enables an increase of the offset position between the housing inlet and of the second housing outlet.

According to at least one example embodiment, the housing inlet is located on an opposite side of a middle point of the filter housing in relation to the second outlet of the air filter element, when the air filter element is housed in the filter housing. This enables a further increase of the offset position between the housing inlet and the second housing outlet.

According to at least one example embodiment, the first housing outlet has a cross-sectional area and the second housing outlet has a cross-sectional area, wherein the cross-sectional area of the second outlet is smaller than the cross-sectional area of the first outlet. As mentioned above, this improves the acoustic response of the air filter system, and enables a compact design.

According to at least one example embodiment, the filter system further comprises a housing lid, the housing lid encompassing, or comprising, the second housing outlet. Moreover, when the air filter element is installed into the filter housing, and the housing lid closes the inner housing space, the housing lid typically encompasses the second outlet of the air filter element. This provides for closing and possibly sealing of the filter housing.

Thus, the filter housing may be comprised of at least two parts, a first filter housing part including the first and second housing ends as previously described, and a second filter housing part being the housing lid. Thus, the first filter housing part is configured to house a majority of the air filter element, and the second filter housing part is configured to close the air filter element in the inner housing space.

According to at least one example embodiment, the housing lid comprises a protruding pipe portion for connection to an adjoining pipe. The protruding pipe portion may have an extension away from the inner housing space. Having an adjoining pipe connected to the filter housing provides for an easier attachment to an auxiliary component.

According to at least one example embodiment, the inner housing shape of the filter housing is adapted to match to an outer shape of the air filter element. This provides for the filter housing to correspond to the air filter element, such that a fluid to be filtered is generally evenly spread between the filter housing and the air filter element to fully utilize the filtering operation of the air filter element. Moreover, the air filter element can snuggly be fitted into the filter housing.

According to at least one example embodiment, the filter housing is an air filter housing. Thus, the filter system is an air filter system.

According to at least a third aspect of the present invention, an internal combustion engine system is provided. The internal combustion engine system comprises a filter system according to the second aspect of the invention.

According to at least a fourth aspect of the present invention, a vehicle is provided, the vehicle comprising an internal combustion engine system according to the third aspect of the present invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
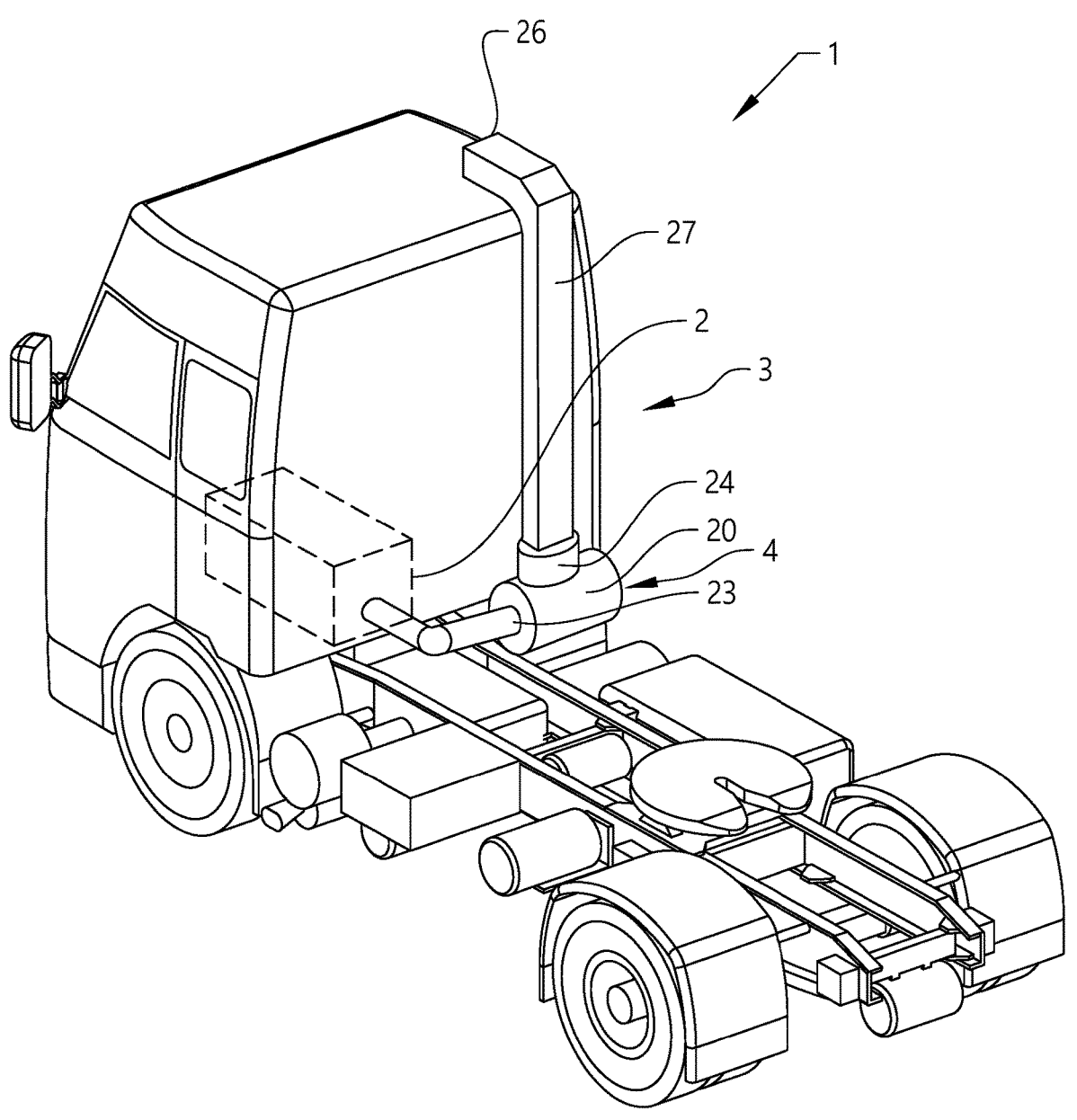
FIG. 1 illustrates a vehicle carrying a filter housing and an air filter element according to this disclosure.

With reference to FIG. 1 a vehicle 1, here embodied as a heavy duty truck 1, is disclosed for which an internal combustion engine system 2 of a kind disclosed in the present disclosure is advantageous. However, the internal combustion engine system 2 may as well be implemented in other types of vehicles, such as in busses, light-weight trucks, passenger cars, marine applications etc. The internal combustion engine system 2 may be based on e.g. a diesel engine, which as such may be running on several different types of fuel, such as diesel or dimethyl ether, DME. Other fuel types are well suited, as well as hybrid systems. The internal combustion engine system 2 is provided with an air intake system 3 comprising a filter system 4 with a filter housing 20 holding an air filter element (as shown in e.g. FIG. 2) of the kind disclosed herein. The air intake system 3 further comprises an air intake pipe 27 located upstream of the filter system 4, configured to draw air from the ambient by an air intake 26. The ambient air is most often in need of filtration before being directed towards an inlet of the internal combustion engine system 2 and/or any auxiliary use. Downstream the air intake 26 and air intake pipe 27 is a housing inlet 24 arranged in the filter housing 20 to supply air to the air filter element. The air is then filtered by the air filter element and further directed through a housing outlet 23 and towards the internal combustion engine system 2. The air filter system 4 may further provide filtered air to an auxiliary component (not shown). In such cases the housing outlet 23 is a first housing outlet and the air filter housing 30 further comprises a second outlet (as shown in e.g. FIG. 3a). The filter system 4 is located in a lower region of the vehicle 1 and the air intake 26 in a higher region of the vehicle 1. In the depicted embodiment the filter system 4 is located directly behind the vehicle cab, whereas the air intake 26 is located on top of the vehicle cab at a rear end thereof. The air intake pipe 27 is located at the rear end in a generally vertical position of the vehicle cab, and the filter housing 20 is located having its longitudinal, or axial, direction transversal to the driving direction of the vehicle 1.

Figure 2A:
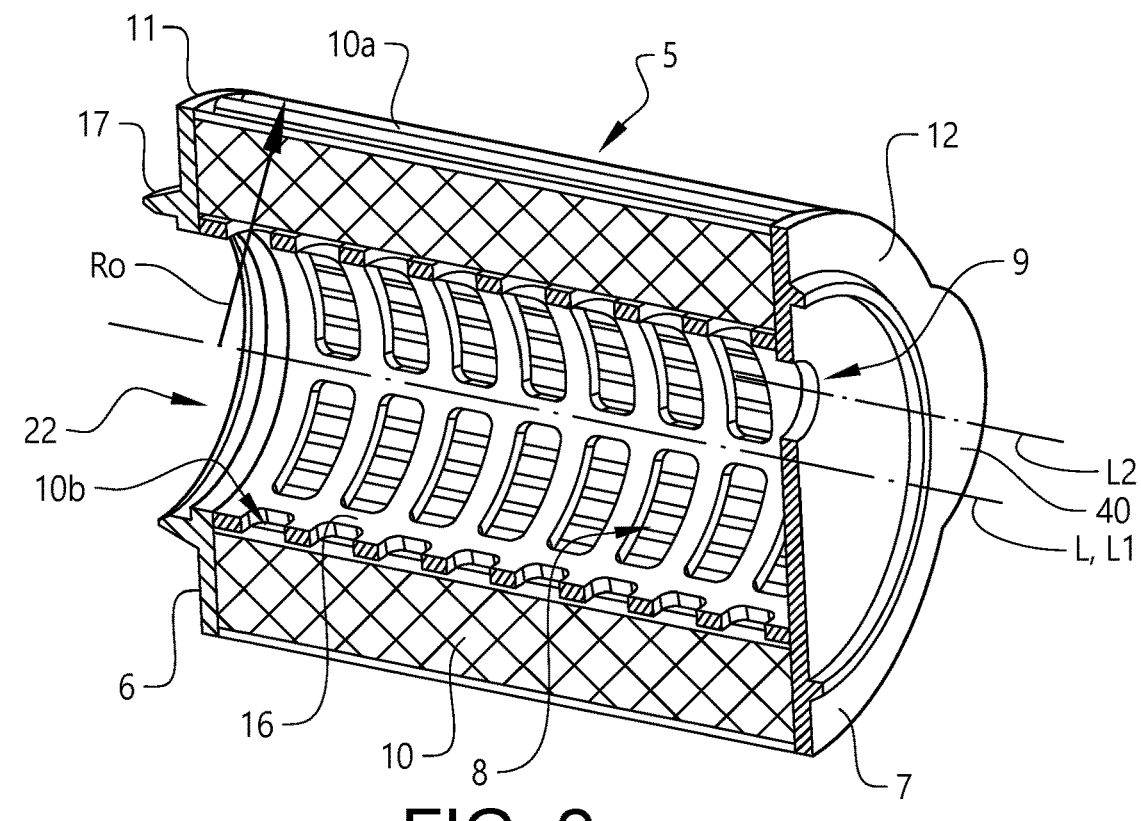
FIG. 2a is a view of a length-wise cross-section of an embodiment of an air filter element of this disclosure.
Figure 2B:
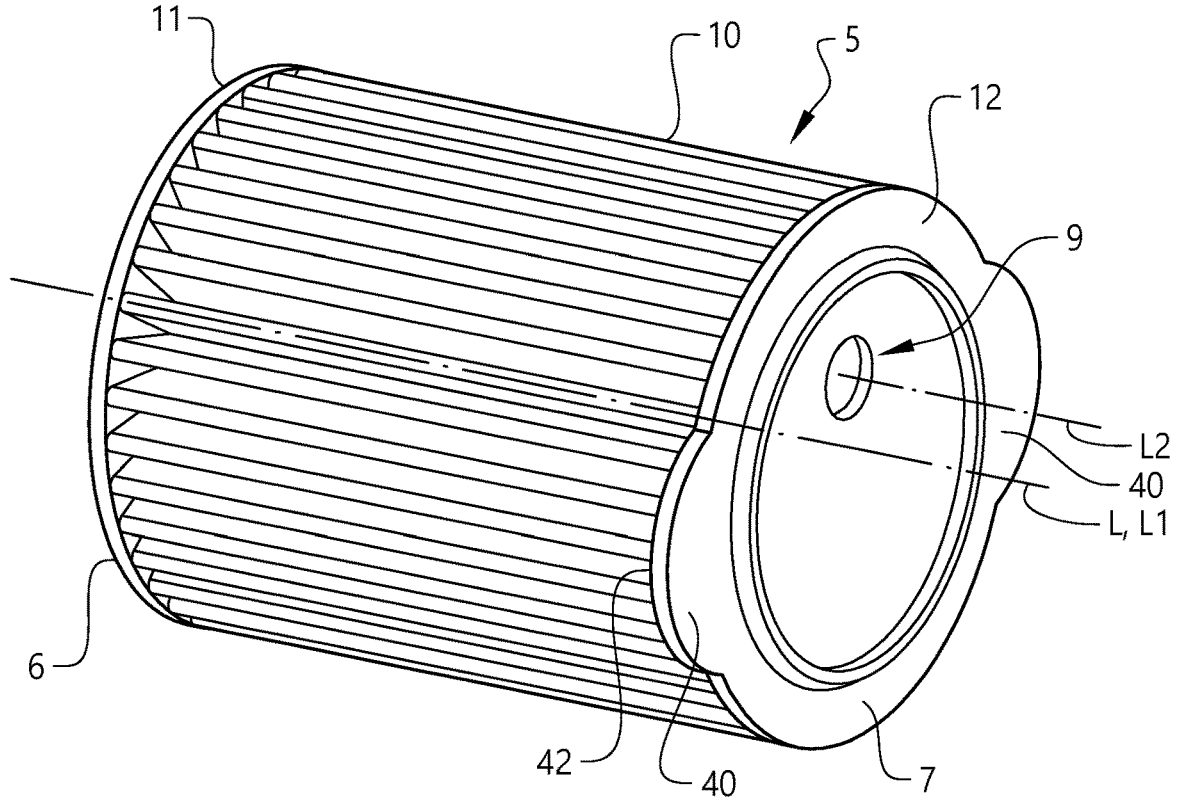
FIG. 2b is a perspective view of the air filter element of FIG. 2a, FIG. 3 is a view of a length-wise cross-section of an embodiment of a filter housing of this disclosure.

Initially a description of a first embodiment of the present disclosure will be provided based on FIGS. 2a and 2b illustrating an air filter element 5. The air filter element 5 is adapted to be removably arranged in a filter housing 20 (shown e.g. in FIG. 3) and comprises a filter body 10 made of any material that is suited for the filtering operation of the air to be filtered.

The air filter element 5 has an extension in a longitudinal direction along a longitudinal centre axis L (which may also be referred to as an axial axis of the air filter element 5), and an extension in a transversal direction in a transversal plane which is perpendicular to the longitudinal direction and the longitudinal centre axis L. Such transversal plane typically includes a radial axis for a tubular, or circular cylindrical, air filter element 5 as shown in FIG. 2a.

The air filter element 5 in FIGS. 2a and 2b comprising a first end 6 and a second end 7. The second end 7 is located opposite to the first end 6 in relation to the air filter element 5 along the longitudinal centre axis L. The air filter element 5 further has a first end panel 11 at the first end 6 and a second end panel 12 at the second end 7. As will be described in more detail with reference to FIG. 4, but briefly mentioned here, the air filter element 5 is configured for axial insertion (i.e. along the longitudinal or axial direction of the filter housing) into the filter housing 20, with the first end 6 leading the axial insertion. Moreover, the air filter element 5 in FIGS. 2a and 2b has a circular cylindrical tubular shape defining an inner space 8, wherein a first outlet 22 and a second outlet 9 are in communication with the inner space 8, as shown in FIG. 2a. The second outlet 9 has here an offset position in relation to the first outlet 22 in the transversal direction of the air filter element 5. As seen in FIG. 2, the offset position involves a distance, and preferably is a distance, in the transversal direction of the air filter element 5. The offset position is measured as a mutual distance as seen in the transversal direction of the air filter element 5 between a centre point in the first outlet 22 and a centre point in the second outlet 9. The first outlet 22 is located coaxially with the air filter element 5, or stated differently, the centre point of the first outlet 22 is located on the longitudinal centre axis L of the air filter element 5. The offset position of the second outlet 9 in relation to the first outlet 22 is consequently in this embodiment measured as a distance in the transversal direction of the air filter element 5 between the longitudinal centre axis L of the air filter element 5 and the centre point of the second outlet 9. The first outlet 22 is adapted for conveying clean air to the internal combustion engine system 2, and the second outlet 9 is adapted for conveying clean air to an auxiliary component, such as brake compressor, which may be located within the internal combustion engine system 2, or in another position in the vehicle 1. In this embodiment, each one of the first outlet 22 and the second outlet 9, has an axial extension. Consequently, the first outlet 22 has a first centre axis L1 coinciding with the longitudinal centre axis L and a centre point of the first outlet 22, and the second outlet 9 has a second centre axis L2 coinciding with the centre point of the second outlet 9, depicted in FIG. 2a, wherein the offset position of the second outlet 9 in relation to the first outlet 22 is measured as an offset position between the second centre axis L2 in relation to the first centre axis L1 in the transversal direction of the air filter element 5.

In FIGS. 2a and 2b, the first outlet 22 is located in the first end panel 11 and the second outlet 9 is located in the second end panel 12. The first end panel 6 is arranged to block any filtered fluid to exit the air filter element 5 axially through the first end panel 11 other than through the first outlet 22. The first end panel 11 is hence located at the first end 6 such that it covers both the filter body 10 and any parts of the inner space 8 surrounding the first outlet 22 at this end. The second end panel 12 is arranged to block any filtered fluid to exit the air filter element 5 axially through the second end panel 12 other than through the second outlet 9. The second end panel 12 is hence located at the second end 7 such that it covers both the filter body 10 and any parts of the inner space 8 surrounding the second outlet 9 at this end. The first end panel 11 and the second end panel 12 may be made of a single panel as in the depicted embodiment, or of a combination of materials and/or sub-panels. Both the first end panel 11 and the second end panel 12 are made planar and parallel to the transversal direction of the air filter element 5. Further, both the first outlet 22 and the second outlet 9 have a cylindrical cross-section, and as can be seen in FIG. 2b, the cross-sectional area and the diameter of the second outlet 9 are substantially smaller than the cross-sectional area and the diameter of the inner space 8. It should be noted that the cross-sectional area and the diameter of the second outlet 9 is substantially smaller than the cross-sectional area and the diameter of the first outlet 22, the latter being substantially the same as the cross-sectional shape and diameter of the inner space 8. The first outlet 22 is located coaxially with the air filter element 5. The air filter element 5 in FIG. 2a further comprises a sealing portion 17 arranged and configured for sealing engagement around the first outlet 22. The sealing portion 17 is typically made of a flexible rubber material which may adapt in use to a surface of the filter housing or of a pipe portion to which it abuts.

Furthermore, the air filter element 5 comprises a filter body 10 arranged between the first and second ends 6, 7 of the air filter element 5. The filter body 10 is arranged surrounding the inner space 8, and comprises an outer sleeve surface 10A configured to receive unfiltered air and being bounded by an outer filter body radius Ro. Correspondingly, the filter body 10 comprises an inner sleeve 10B, configured to discharge, or let out, filtered air (i.e. air that has been filtered through the filter body 10). As illustrated in FIG. 2a, the air filter element 5 of this embodiment comprises an inner portion 16 holding the filter body 10 at the inner sleeve 10B for maintaining the shape of the air filter element 5 when air is filtered through the filter body 10, and to avoid collapsing of the filter body 10 due to the air pressure during use. The inner portion 16 is tubular and air permeable, and is typically made of a plastic material. The inner portion 16 is in the present embodiment made as a rectangular net, configured to maintain the shape of the air filter element 5 and not interfere the air flow through the air filter element 5. The thickness of the inner portion 16 is typically small in relation to the thickness of the filter body 10. When the air filter element 5 is used in connection with an internal combustion engine system 2, i.e. when the filtering operation is performed on air such as ambient air, the filter body 10 is typically made of a material such as paper or cellulose. The filter body 10 of the depicted embodiments has a corrugated or pleated surface, but may be constructed differently and be of other suitable materials, or material combinations.

It should be understood, that the positioning the second outlet 9 in the depicted position improves the acoustic response of the air filter element 5. The air filter element 5 may consequently be used as a noise reduction means. The larger the offset between the first center axis L1 and the second axis L2, the better from a noise reduction point of view. The best noise reduction properties will be achieved when a maximum distance is used for the offset. In the depicted embodiment the second outlet 9 is hence positioned as close as possible to the inner sleeve 10B of the filter body 10, which position is related to the diameter of the second outlet 9. This position is achieved when the outer periphery of the second outlet 9 is located adjacent to the periphery of the inner space 8 and consequently of the inner portion 16 or inner sleeve 10B of the filter body 10. In other words, the centre point of the second outlet 9 and thus the second centre axis L2 is located at a distance corresponding to half the diameter of the second outlet 9 from the periphery of the inner space 8.

Correspondingly, the outer periphery of the first outlet 22 is located adjacent to the periphery of the inner space 8. Since the diameter of the first outlet 22 is substantially the same as the diameter of the inner space 8, the first outlet 22 cannot be positioned otherwise in this embodiment and hence a maximum offset position of the second outlet 9 is achieved. If however the diameter of the first outlet 22 would be less than the diameter of the inner space 8, then it would be possible to further increase the offset position between the first outlet 22 and the second outlet 9. The maximum available offset position is set by the geometrical constraints of the air filter element 5, such that the maximum available offset position equals a distance or length corresponding to the diameter of the inner space 8 subtracted by the radius of the outer periphery of the second outlet 9 and by the radius of the outer periphery of the first outlet 22. The offset position should be at least 50%, or preferably at least 75%, or more preferably at least 90% of the maximum available offset position.

According to at least one example embodiment, the second end panel 12 comprises a protruding pipe portion (now shown) which adjoins and surrounds the second outlet 9. The protruding pipe portion may e.g. be made in one piece with the second end panel 12. The protruding pipe portion may e.g. be designed for connection to an adjoining pipe for further distribution of filtered secondary air to an auxiliary component, such as brake compressors, as previously described.

As best shown in FIG. 2b, the air filter element 5 comprises a gripping structure 40 at the second end 6, integrated in the second end panel 12. The gripping structure 40 comprises an external surface 42 accessible for interaction by a tool to facilitate removal of the air filter element 5 from the filter housing 20. As shown in FIG. 2a, the gripping structure extends radially outside the outer filter body radius Ro in order to facilitate such tool interaction. The gripping structure 40 is also configured to, during insertion of the air filter element 5 into the filter housing 20, radially align the air filter element 5 in the filter housing 20, which is further elucidated with reference to FIGS. 6a-6c. The gripping structure 40 may instead of being integrated into the second end panel 12, be made of a separate part attached to the second end 6 of the air filter element 5.

Figure 3:
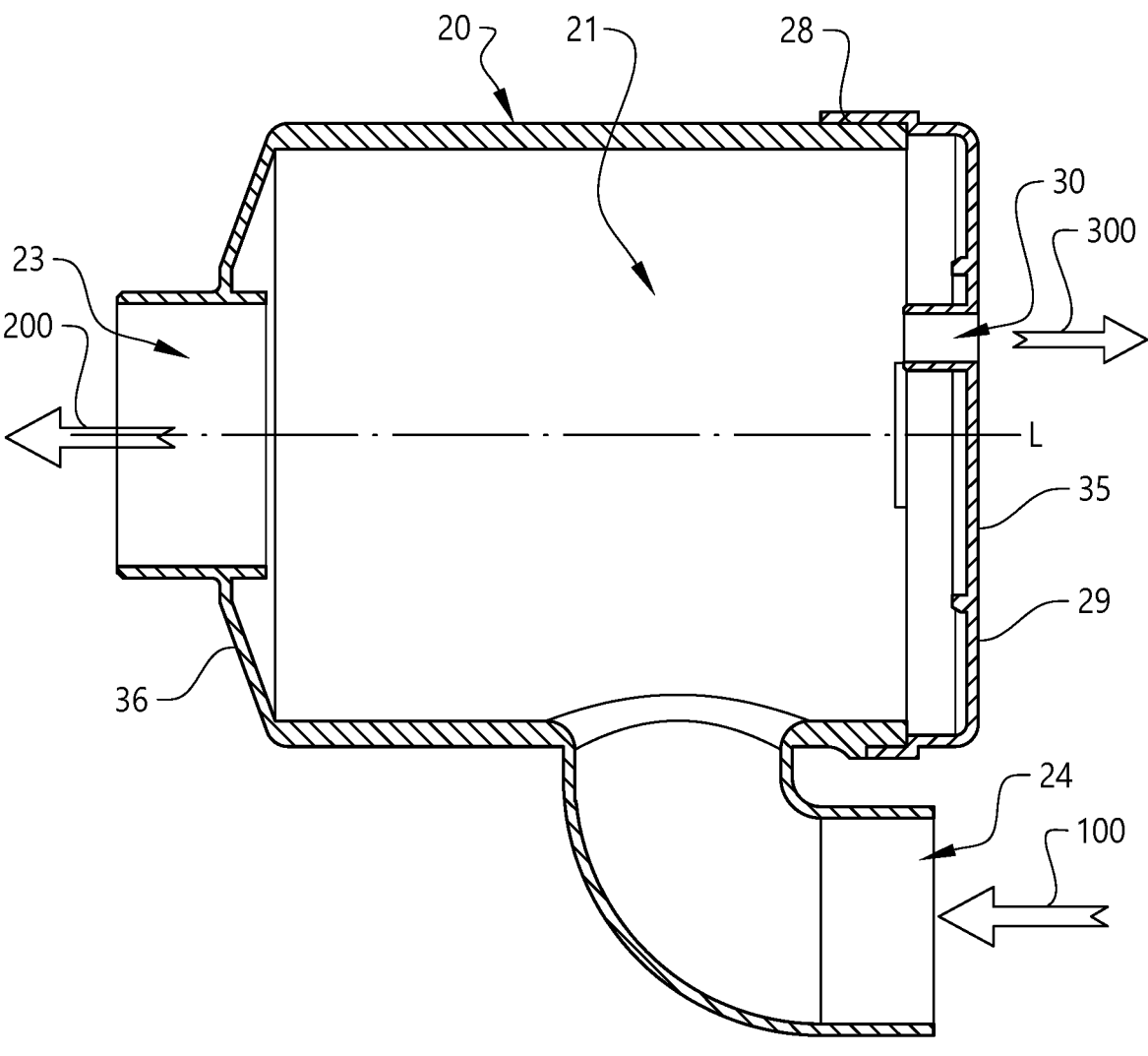

Turning now to FIG. 3, a flow of air to be filtered through the filter system 4 and the air filter element 5 is disclosed in relation to the filter housing 20. The filter housing 20 has an extension in a longitudinal direction along a longitudinal centre axis L, and an extension in a transversal direction in a transversal plane which is perpendicular to the longitudinal direction and the longitudinal centre axis L. The longitudinal centre axis L of the filter housing 20 coincides with the longitudinal centre axis L of the air filter element 5, when the air filter element 5 is inserted into the filter housing 20. The filter housing 20 comprises a housing inlet 24, a first housing outlet 23 and a second housing outlet 30. The housing inlet 24 is located in the curved outer periphery, or in other words, in the envelope surface of the filter housing 20. The curved envelope surface is circular cylindrical. The housing inlet 24 is furthermore slightly inclined in relation to a normal to the outer periphery. The filter housing 20 in FIG. 3 comprises a housing lid 35 for opening the filter housing 20 to an inner housing space 21 which is adapted to receive the air filter element 5. The housing lid 35 is also adapted to seal the opening in the filter housing 20 when the housing lid 35 is closed.

The filter housing 20 further has a first housing end 36 and a second housing end 28 located distant to the first housing end 36 in relation to the longitudinal direction of the filter housing 20. Moreover, the housing lid 35 comprises an end surface 29 arranged opposite the first housing end 36 relative the inner housing space 21 and along the longitudinal centre axis L. The first housing end 36 and the end surface 29 of the housing lid 35 are generally parallel to a transversal direction of the filter housing 20. The housing lid 35 is closed using e.g. otherwise known clips. The housing lid 35 may as shown in FIG. 3 encompass, the second housing end 28.

The first housing outlet 23 is located in the first housing end 36 and the second housing outlet 30 is in the embodiment shown in FIG. 3, located in the housing lid 35, in the end surface 29. In correspondence with the design of the air filter element 5, the first housing outlet 23 is located coaxially with the envelope surface of the filter housing 20. The first housing outlet 23 has a first centre axis and the second housing outlet 30 has a second centre axis. Also, in correspondence with the design of the air filter element 5, the offset position of the second housing outlet 30 in relation to the first housing outlet 23 is defined by an offset position between the second centre axis in relation to the first centre axis in the transversal direction of the filter housing 20. The offset position involves a distance, and preferably is a distance, in the transversal direction of the filter housing 20. The offset position is measured as a mutual distance as seen in the transversal direction of the filter housing 20 between a centre point in the first housing outlet 23 to a centre point in the second housing outlet 30. The second housing outlet 30 is furthermore located in a position the most far away from the housing inlet 24 in the filter housing 20 in order to improve the acoustic response of the filter housing 20. In order for the air filter element 5 to be installable in the filter housing 20, the first housing outlet 23 is positioned within the filter housing 20 in a position corresponding to the position of the first outlet 22 in the air filter element 5, and the second housing outlet 30 is positioned within the filter housing 20 in a position corresponding to the position of the second outlet 9 in the air filter element 5.

The housing lid 35 has at the second housing outlet 30 a pipe portion 30 which is made in one piece with the housing lid 35. The pipe portion 30 has an outer diameter which is adapted to tightly enclose the second outlet 9 of the air filter element 5 when the air filter element 5 is installed in the filter housing 20. The pipe portion 30 may be adapted to also seal off the inner housing space 21 from the ambient.

When in use, the air to be filtered, represented by arrow 100, enters the filter housing 20 through the housing inlet 24, spreads around the outside of the air filter element 5 and the outer sleeve 10A of the filter body 10, and penetrates through the air filter element 5 and the filter body 10 such that the air is filtered. Finally, the filtered, and preferably generally cleaned, air leaves the filter housing 20 through the first housing outlet 23 (represented by arrow 200) and the second housing outlet 30 (represented by arrow 300). The air intake pipe 27 which connects to the housing inlet 24 may be inclined such that the fluid has a flow component directed slightly towards the first housing outlet 23.

It should be noted that the filter housing 20 may have many other designs and still maintain the filtering, noise reduction and housing function in relation to the air filter element 5.

Figure 4:
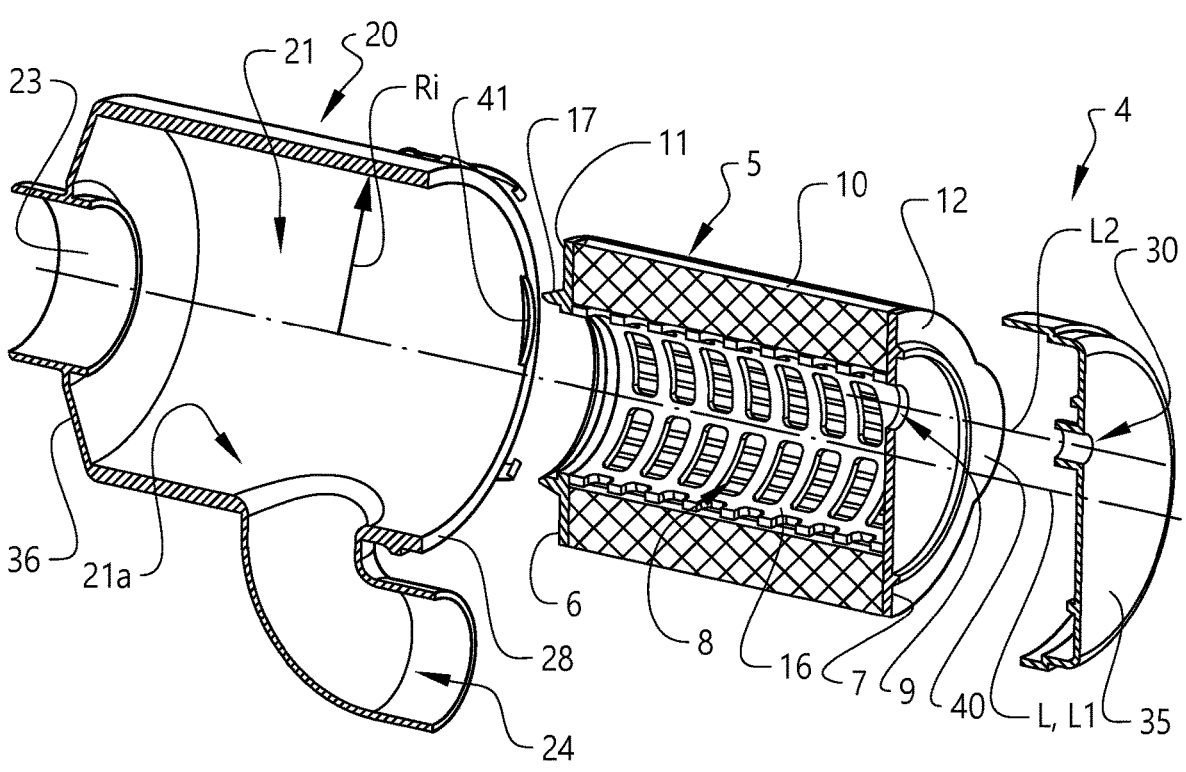
FIG. 4 illustrates an exploded length-wise cross-section of an embodiment of the air filter element installed in the filter housing.

Turning to FIG. 4 illustrating an exploded view of the filter system 4, i.e. the air filter element 5 of FIGS. 2a-2b installed in the filter housing 20 of FIG. 3. Here, the filter housing 20 and the inner housing space 21 is adapted for axial insertion and removal of the air filter element 5 into/from the inner housing space 21.

The filter housing 20 has generally the same curved shape as the air filter element 5 in order to distribute the air well around the air filter element 5. An outer surface of the air filter element 5, typically the outer sleeve 10A of the filter body 10, is adapted to be closely aligned with a curved inner surface of the filter housing 20, as depicted in FIG. 4, in which the air filter element 5 is disclosed in a position installed in the filter housing 20. The filter housing 20 has a curved inner surface which is slightly larger than the outer curved shape of the air filter element 5, such that the air to be filtered may spread well around the air filter element 5 in order to utilise the full outer surface are of the air filter element 5. Moreover, the first housing end 36 of the filter housing 20 is arranged adjacent to the first end 6 of the air filter element 5 when housed in the inner housing space 21. Correspondingly, the second housing end 28 of the filter housing 20 is located distant to the first housing end 36 in relation to the longitudinal direction of the filter housing 20, and is arranged adjacent to, or circumferentially encompassing, the second end 7 of the air filter element 5 when housed in the inner housing space 21.

In FIG. 4, the pipe portion 30 of the filter housing 20 protrudes into the second outlet 9 of the air filter element 5. It may also be gleaned that the sealing portion 17 at the first outlet 22 of the air filter element 5 is adapted in size and position to the first housing outlet 23 of the filter housing 20 in order to seal off the inner housing space 21 from the ambient and the inner space 8 from the inner housing space 21. Thus, in FIG. 4, it is also clear that the first outlet 22, located in the first end 6 of the air filter element 5 is configured to communicate with the corresponding first housing outlet 23 in the filter housing 20, and that the second outlet 9 located in the second end 7 of the air filter element 5 is configured to communicate with the corresponding second housing outlet 30 in the filter housing 20.

As seen in FIG. 4, the filter housing comprises a guiding structure 41 at the second housing end 28, the guiding structure 41 being configured to mate with the gripping structure 40 of the air filter element 5. Thus, the gripping structure 40 is configured and arranged to mate with the guiding structure 41 to at least radially align the air filter element 5 in the filter housing 20 during insertion and installation of the air filter element 5 to the filter housing 20. Thus, the gripping structure 40 is configured to radially align the air filter element 5 in the filter housing 20 by being configured to interact with the corresponding guiding structure 41 of the filter housing 20. By the configuration of the gripping structure 40, and e.g. desired positioning of the air filter element 5 in the filter housing 20, the air filter element 5 can be radially aligned in the filter housing 20 such that for example the second outlet 9 of the air filter element 5 aligns with the second housing outlet 30, and here, the pipe portion 30. In other words, the gripping structure 40 and the guiding structure 41 are configured and arranged to align the second outlet 9 of the air filter element 5 with the second housing outlet 30 of the filter housing 20.

The inner housing space 21 of the filter housing 20 comprises an inner housing surface 21A being bounded by an inner housing radius Ri. When the air filter element 5 is housed in the inner housing space 21 of the filter housing 20, the gripping structure 40 extends radially outside of the inner housing radius Ri. Hereby, the axial positioning of the air filter element 5 in the filter housing 20 is at least partly determined by the gripping structure 40. This is further elucidated with reference to FIGS. 6a-6c and FIG. 7.

Figure 5:
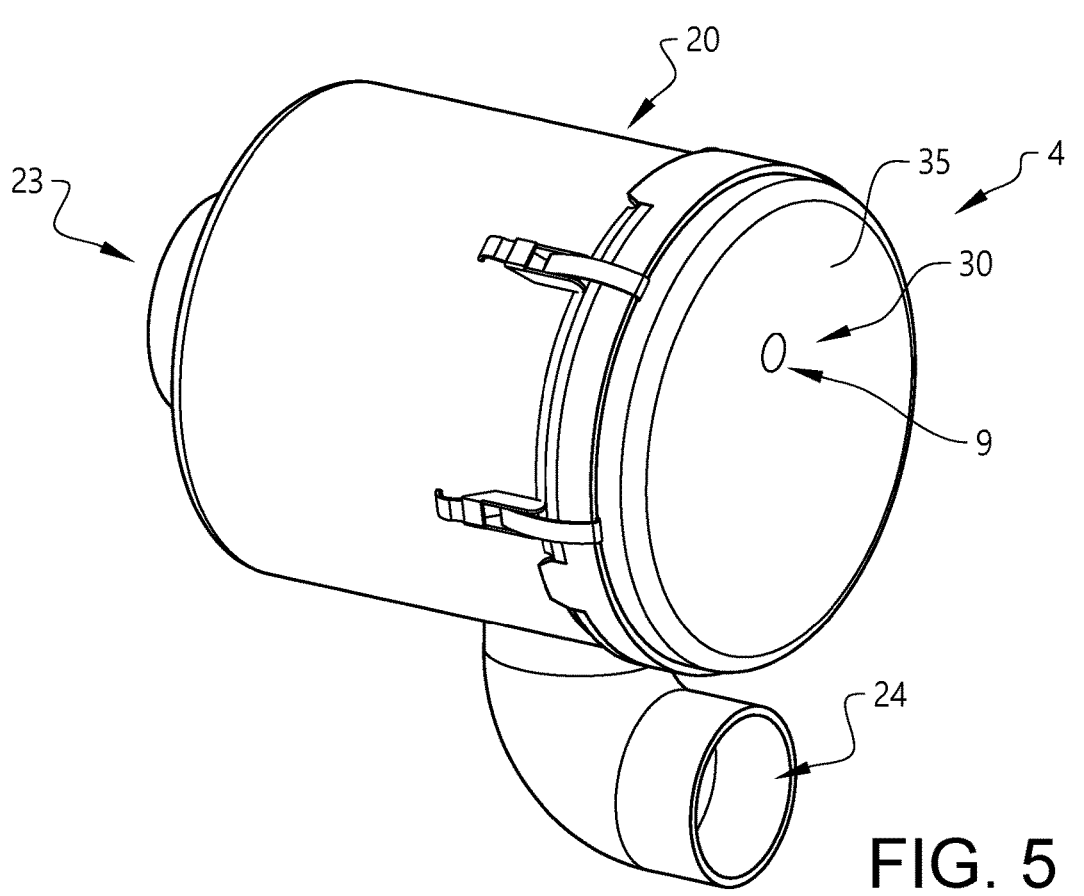
FIG. 5 is a perspective view of an embodiment of the air filter element installed in the filter housing.

As depicted in FIG. 5 the air filter element 5 is disclosed installed in the filter housing 20 with the housing lid 35 closed. Generally only the second outlet 9 may be seen of the air filter element 5. Moreover, the housing inlet 24, and first and second housing outlets 23, 30 are shown in FIG. 5.

Figure 6A:
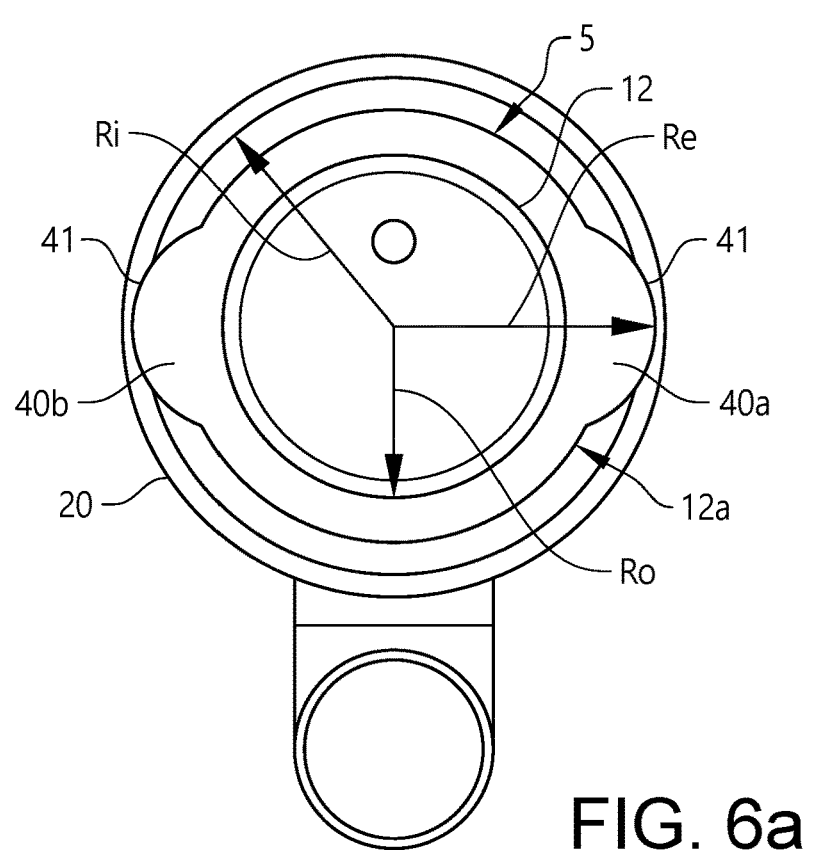
FIGS. 6a-6c, are top views of filter elements installed in a respective filter housing, according to various embodiments of this disclosure.
Figure 6B:
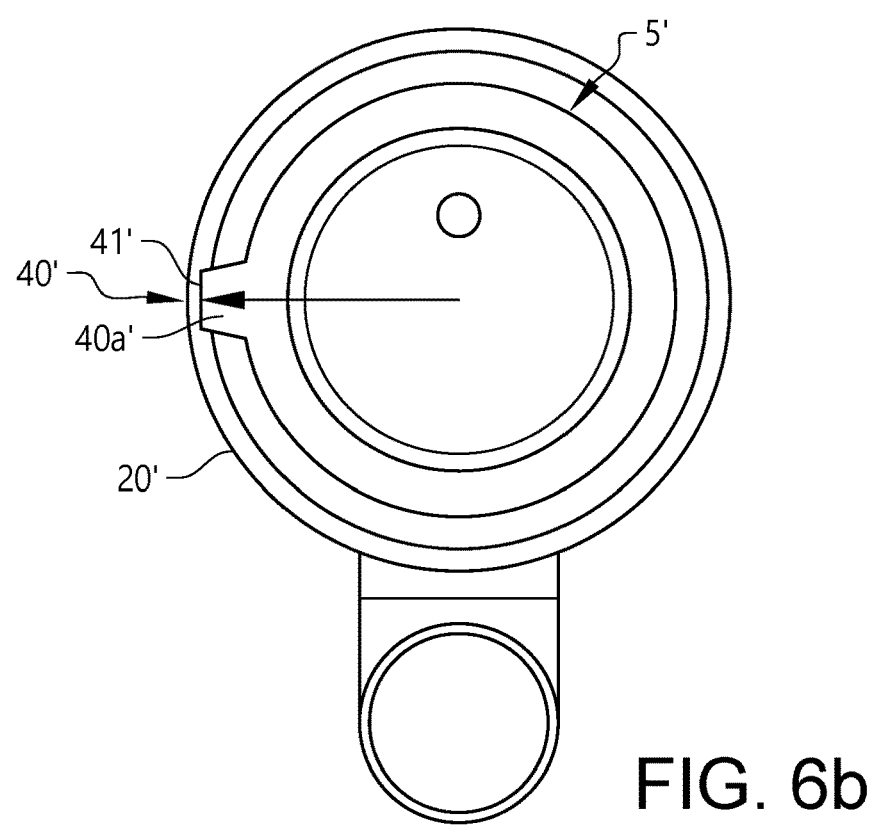
Figure 6C:
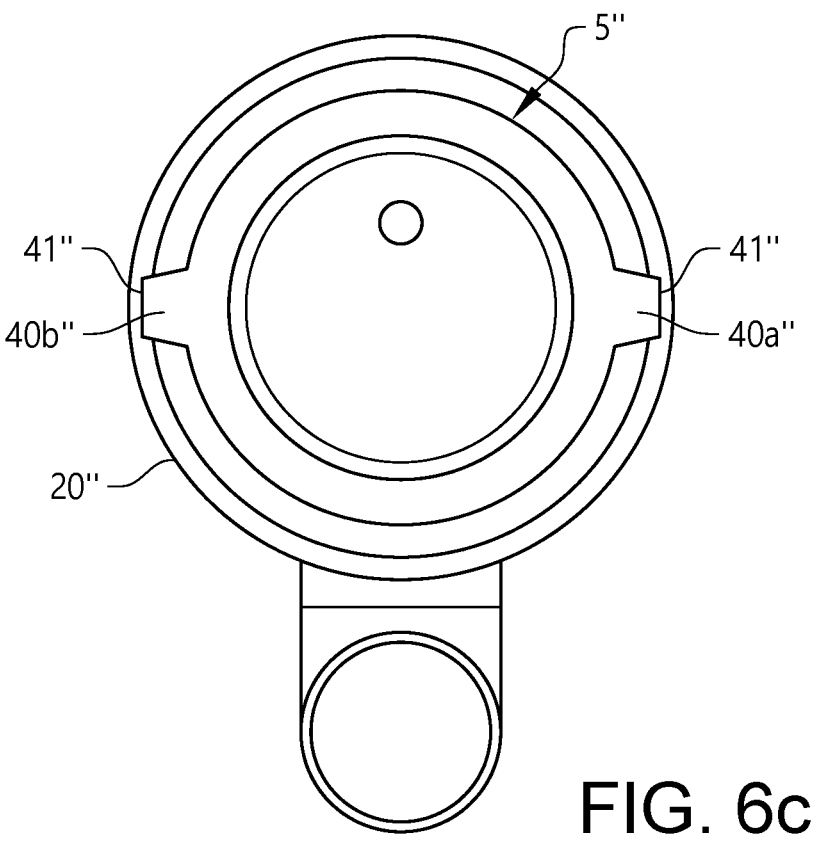

Various embodiments of the air filter element 5 and the filter housing 20 of FIGS. 2-5 are shown in FIGS. 6a-6c in which corresponding features and components have been given corresponding reference numerals with the addition of one or more apostrophes.

FIG. 6a generally discloses the embodiment shown in FIG. 4, where the gripping structure 40 of the air filter element 5 is shown in greater detail. In FIG. 6a, the gripping structure 40 is integrated into the second end panel 12 to form a first gripping portion 40A and a second gripping portion 40B. The first and second gripping portions 40A, 40B are arranged distant from each other, and in FIG. 6a, on opposite sides of the second end panel 12. Each one of the first and second gripping portions 40A, 40B, is shaped as a radially extending portion having an outer curved surface. Thus, the first and the second gripping portions 40A, 40B are shaped as two ears of the second end panel 12. Moreover, the second end panel 12 is bound by an outer border 12A which together with the gripping structure 40 forms an irregular contour about/around the longitudinal centre axis L of the air filter element 5 (i.e. in a geometrical plane being perpendicular to the longitudinal direction of the air filter element 5, or stated differently, in a radial plane). Each one of the first and second gripping portions 40A, 40B has an outermost point in the outer border 12A at a radial distance Re from the centre of the second end panel 12. As shown in FIG. 6a, Re is larger than both Ri (the inner housing radius) and Ro (outer filter body radius) so that the gripping structure 40 limits the axial insertion/positioning of the air filter element 5 into the filter housing 20.

In FIG. 6b a similar air filter element 5' as the one shown in FIG. 6a is shown. In FIG. 6b, the air filter element 5' is housing in a filter housing 20', and comprises a gripping structure 40' forming a single gripping portion 40A'. Here, the gripping structure 40' is shaped as a trapezoid, still with a radial extension larger than both Ri (the inner housing radius) and Ro (outer filter body radius).

In FIG. 6c another embodiment of the air filter element 5" is shown. The air filter element 5" is housed in a filter housing 20", and comprises a gripping structure 40" similar to that of FIG. 6b, but with two opposite gripping portions 40A", 40B". Thus, the embodiment in FIG. 6c also corresponds in large to the air filter element 5 of FIG. 6a, but with the difference that both of the gripping portions 40A", 40B" in FIG. 6c are shaped as trapezoids rather than having curved outer surface boundaries as the gripping portions 40A, 40B in FIG. 6a.

In all of the embodiments shown in FIGS. 6a-6c, the air filter elements 5, 5', 5" and the respective second end panel 12, 12', 12" has an outer flat surface extending in a geometrical plane perpendicular to the longitudinal direction of the air filter element 5. Such flat structure makes the air filter element 5, 5', 5", and the corresponding filter system 4, compact. Moreover, in all of the embodiments shown in FIGS. 6a-6c, the filter housing 20, 20', 20" comprises a guiding structure 41, 41', 41" configured and arranged to mate with the gripping structure 40, 40', 40", of which one example embodiment is shown in greater detail in FIG. 7.

Figure 7:
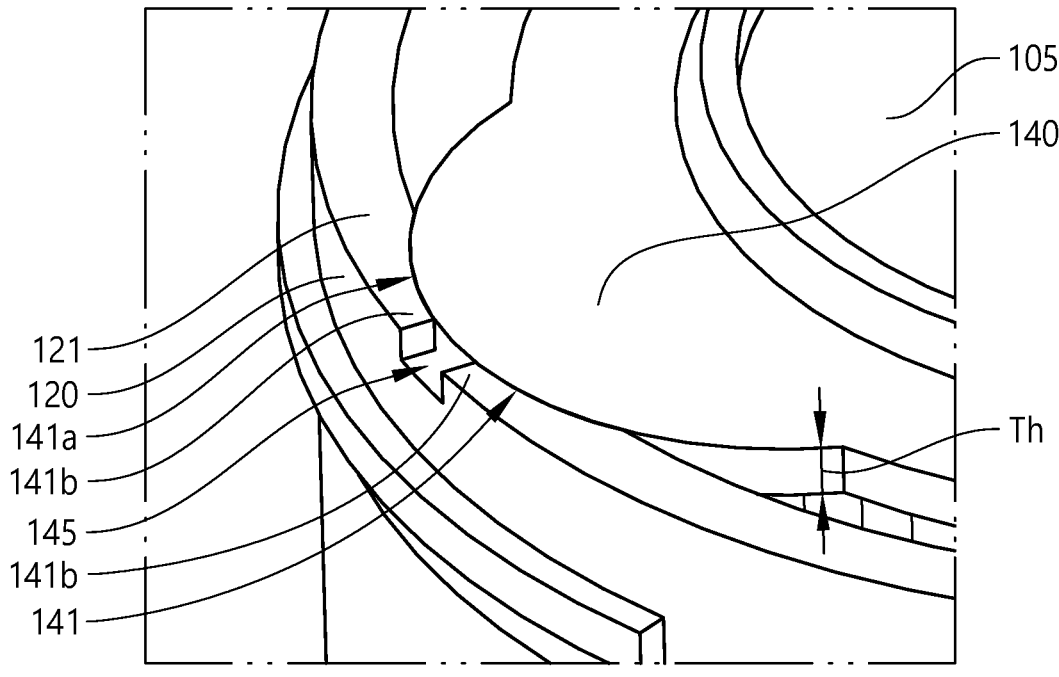
FIG. 7 is an enlarged view of a detail of the filter system showing the gripping structure and the guiding structure in accordance with an embodiment of this disclosure.

In FIG. 7, a detail of a gripping structure 140 of an air filter element 105 is shown to mate with a guiding structure 141 of a filter housing 120. The gripping structure 140 is shaped with a rounded outer curvature (but may as well be shaped as a trapezoid) and extends radially outwardly beyond an inner housing radius of the filter housing 120

(corresponding to previously mentioned Ri) and the outer filter body radius of a filter body of the air filter element 105 (corresponding to previously mentioned Ro). The guiding structure 141 in the filter housing 120 is here embodied as a guiding indentation 141A. Thus, an outer portion of the gripping structure 140 is able to mate with guiding indentation 141A to align the air filter element 105 in the filter housing 120. Moreover, the guiding structure 141 may be formed with a locking structure 141B, which in FIG. 6c is embodied as two opposite curved flanges configured to lock the gripping portion 140 in position.

As seen in FIG. 7, the guiding structure 141 is arranged in an edge 121, such as an outer edge 121, of the filter housing 120. By the interaction of the gripping structure 140 and the guiding structure 141, the gripping structure 140 will be arranged to rest against the edge 121, and thus the air filter element 105 will be arranged to rest against the filter housing 120. Hereby, the air filter element 105 can be axially positioned inside the filter housing 120.

Furthermore, as disclosed in FIG. 7, the gripping structure 140 is arranged to mate with the guiding structure 141 to form a tool interaction portion 145, here embodied as a gap 145 between a surface of the edge 121 and a surface of the gripping structure 140. The tool interaction portion 145 is configured to be accessed by a tool to facilitate removal of the air filter element 105 from the filter housing 120.

Moreover, as shown in FIG. 7, the thickness, Th, of the gripping structure 140 is relatively limited, e.g. less than 25 mm in the axial direction.

In the above disclosed embodiments the direction of fluid flow may be opposite to the one depicted, the size of the filter housing in relation to the air filter element may be different, the material of the filter body may be other such as e.g. made of a foam material, the thickness of the air filter element may be otherwise chosen, the size and position of the first outlet, and first housing outlet, may be otherwise chosen, without deviating from the scope of this disclosure. Moreover, the second outlet, and second housing outlet can be omitted, i.e. there need not to be a second outlet in the air filter element or second housing outlet, but if included, the size and position of such second outlet and second housing outlet may be otherwise chosen (it second outlet and second housing outlet may be a simple hole or orifice, possibly provided with a sealing ring, and an adjoining pipe which is used for further distribution of filtered secondary air to an auxiliary component) without deviating from the scope of this disclosure.

The air filter element may alternatively be called filter cartridge, filter module or filter insert.

The alternative embodiments which have been disclosed above may be combined in any way which is found advantageous, unless anything else is explicitly stated, as long as the features of the main claims are fulfilled.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An air filter system, comprising:
an air filter element having a first end and a second end located opposite to the first end in relation to a longitudinal direction of the air filter element, the air filter element being configured for axial insertion into a filter housing with the first end leading the axial insertion;
a gripping structure at said second end, said gripping structure comprising an external surface specifically shaped and dimensioned for engagement with a tool to facilitate removal of the air filter element from the filter housing and including guide features configured to mate with corresponding guiding features of the filter housing to radially align the air filter element in the filter housing during insertion of the air filter element into the filter housing;
a first end panel at the first end of the air filter element;
a second end panel at the second end of the air filter element;
a first outlet located in the first end panel and being configured to communicate with a corresponding first housing outlet in the filter housing;
a second outlet located in the second end panel and being configured to communicate with a corresponding second housing outlet in the filter housing, wherein the gripping structure is integrated into the second end panel;
a filter housing having an inner housing space being adapted for axial insertion and removal of the air filter element into/from the inner housing space, the filter housing having a first housing end arranged adjacent to the first end of the air filter element when housed in said inner housing space, and a second housing end located distant to the first housing end in relation to a longitudinal direction of the filter housing, the second housing end being arranged adjacent to the second end of the filter element when housed in said inner housing space, wherein the filter housing comprises a guiding structure at the second housing end configured to mate with the gripping structure of the air filter element to radially align the air filter element in the filter housing during insertion of the air filter element into the filter housing and to align the second outlet of the filter element with the second housing outlet, the guiding structure is a guiding indentation arranged at the annular edge of the second housing end.

2. The air filter system according to claim 1, comprising a filter body arranged between the first and second ends of the air filter element, the filter body forming an outer sleeve surface configured to receive unfiltered air and being bounded by an outer filter body radius, wherein the gripping structure extends radially outside the outer filter body radius.

3. The air filter system according to claim 1, wherein the gripping structure has a thickness of less than 25 mm in the axial direction.

4. The air filter system according to claim 1, wherein the gripping structure is integrated into the second end panel to form a first gripping portion and a second gripping portion, wherein the first and second gripping portions are arranged distant from each other on opposite sides of the second end panel, wherein each one of the first and second gripping portions is shaped as a radially extending portion shaped as trapezoid or having an outer curved surface.

5. The air filter system according to claim 1, wherein the second end panel has an outer flat surface extending in a geometrical plane perpendicular to the longitudinal direction of the air filter element.

6. The air filter system according to claim 5, wherein the second end panel is bound by an outer border which together with the gripping structure forms an irregular contour about the longitudinal axis of the air filter element.

7. The air filter system according to claim 1, wherein the air filter element has a tubular shape defining an inner space in communication with the first and second outlets, the first outlet having a first centre axis and the second outlet having a second centre axis parallel and arranged at an offset position in relation to the first centre axis in a direction perpendicular to the first and second centre axes.

8. The filter system according to claim 1, wherein the gripping structure is configured to rest against an edge in the filter housing to axially position the air filter element within the filter housing.

9. The filter system according to claim 1, wherein the gripping structure is arranged to mate with the guiding structure to form a tool interaction portion configured to be accessed by a tool to facilitate removal of the air filter element from the filter housing.

10. The filter system according to claim 9, wherein the tool interaction portion is a gap between a surface of gripping structure, and an opposite facing surface of the guiding structure.

11. The filter system according to claim 1, wherein the inner housing space comprises an inner housing surface being bounded by an inner housing radius, wherein, when the air filter element is housed in the filter housing, the gripping structure extends radially outside of the inner housing radius.

12. The filter system according to claim 1, wherein the first housing outlet is located in parallel relationship with the second housing outlet.

13. The filter system according to claim 1, wherein the filter housing has a tubular shape.

14. The filter system according to claim 1, wherein a housing inlet is located in an envelope surface of the filter housing.

15. The filter system according to claim 1, further comprising a housing lid, the housing lid encompassing the second housing outlet.

16. The filter system according to claim 1, in which an inner housing shape of the filter housing is adapted to match to an outer shape of the air filter element.

17. The filter system according to claim 1, in which the filter housing is an air filter housing.

18. An internal combustion engine system comprising a filter system according to claim 1.

19. A vehicle comprising an internal combustion engine system according to claim 18.

20. The air filter system according to claim 1, wherein the external surface includes guide features configured to radially align the air filter element within the housing during insertion.

21. An air filter system, comprising:

an air filter element having a first end and a second end located opposite to the first end in relation to a longitudinal direction of the air filter element, the air filter element being configured for axial insertion into a filter housing with the first end leading the axial insertion;

a first end panel at the first end of the air filter element;

a second end panel at the second end of the air filter element;

a gripping structure at said second end, said gripping structure comprising an external surface for engagement with a tool to facilitate removal of the air filter element from the filter housing, and being configured to, during insertion of the air filter element into the filter housing, radially align the air filter element in the filter housing, wherein the gripping structure is integrated into the second end panel to form a first gripping portion and a second gripping portion, wherein the first and second gripping portions are arranged distant from each other on opposite sides of the second end panel, wherein each one of the first and second gripping portions is shaped as a radially extending portion shaped as trapezoid or having an outer curved surface;

a first outlet located in the first end panel and being configured to communicate with a corresponding first housing outlet in the filter housing;

a second outlet located in the second end panel and being configured to communicate with a corresponding second housing outlet in the filter housing;

a filter housing having an inner housing space being adapted for axial insertion and removal of the air filter element into/from the inner housing space, the filter housing having a first housing end arranged adjacent to the first end of the air filter element when housed in said inner housing space, and a second housing end located distant to the first housing end in relation to a longitudinal direction of the filter housing, the second housing end being arranged adjacent to the second end of the filter element when housed in said inner housing space, wherein the filter housing comprises a guiding structure at the second housing end configured to mate with the gripping structure of the air filter element to radially align the air filter element in the filter housing during insertion of the air filter element into the filter housing and to align the second outlet of the filter element with the second housing outlet, the guiding structure is a guiding indentation arranged at the annular edge of the second housing end.

22. The air filter system according to claim 21, wherein the external surface is specifically shaped and dimensioned for engagement with the tool to facilitate removal of the air filter element from the filter housing and includes guide features configured to mate with corresponding guiding features of the filter housing to radially align the air filter element in the filter housing during insertion of the air filter element into the filter housing.

23. An air filter system, comprising:

an air filter element having a first end and a second end located opposite to the first end in relation to a longitudinal direction of the air filter element, the air filter element being configured for axial insertion into a filter housing with the first end leading the axial insertion;

a first end panel at the first end of the air filter element;

a second end panel at the second end of the air filter element;

a gripping structure at said second end, said gripping structure comprising an external surface accessible for interaction by a tool to facilitate removal of the air filter element from the filter housing, and being configured to, during insertion of the air filter element into the filter housing, radially align the air filter element in the filter housing, the gripping structure forms a single gripping portion with a radial extension larger than both an inner housing radius and an outer filter body radius;

a first outlet located in the first end panel and being configured to communicate with a corresponding first housing outlet in the filter housing;

a second outlet located in the second end panel and being configured to communicate with a corresponding second housing outlet in the filter housing;

a filter housing having an inner housing space being adapted for axial insertion and removal of the air filter element into/from the inner housing space, the filter housing having a first housing end arranged adjacent to the first end of the air filter element when housed in said inner housing space, and a second housing end located distant to the first housing end in relation to a longitudinal direction of the filter housing, the second housing end being arranged adjacent to the second end of the filter element when housed in said inner housing space, wherein the filter housing comprises a guiding structure at the second housing end configured to mate with the gripping structure of the air filter element to radially align the air filter element in the filter housing during insertion of the air filter element into the filter housing and to align the second outlet of the filter element with the second housing outlet, the guiding structure is a guiding indentation arranged at the annular edge of the second housing end.

24. The air filter system according to claim 23, wherein the external surface is specifically shaped and dimensioned for engagement with the tool to facilitate removal of the air filter element from the filter housing and includes guide features configured to mate with corresponding guiding features of the filter housing to radially align the air filter element in the filter housing during insertion of the air filter element into the filter housing.

25. The air filter system of claim 1, further comprising:

a lid, wherein the filter housing is radially aligns the air filter element in the filter housing during insertion of the air filter element into the filter housing, prior to the closure of the filter housing with the lid.

* * * * *